April 1, 1958 E. GRETENER ET AL 2,829,051
PHOTOGRAPHICALLY SENSITIVE LENTICULAR FILM
Filed July 18, 1952 2 Sheets-Sheet 1
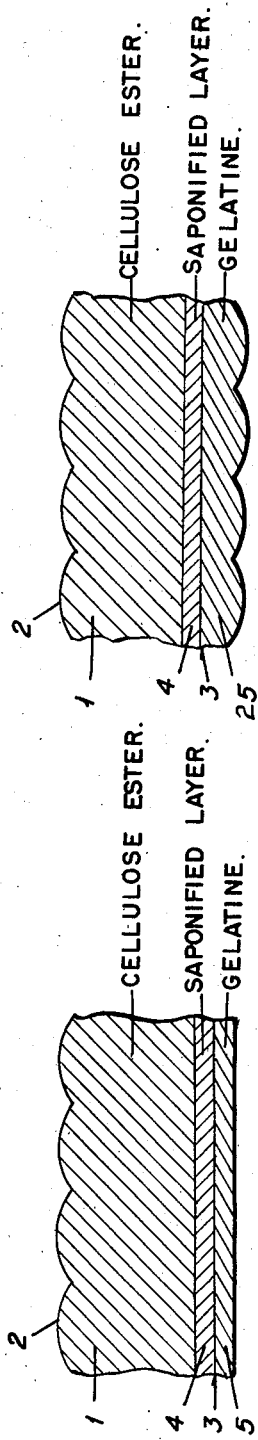
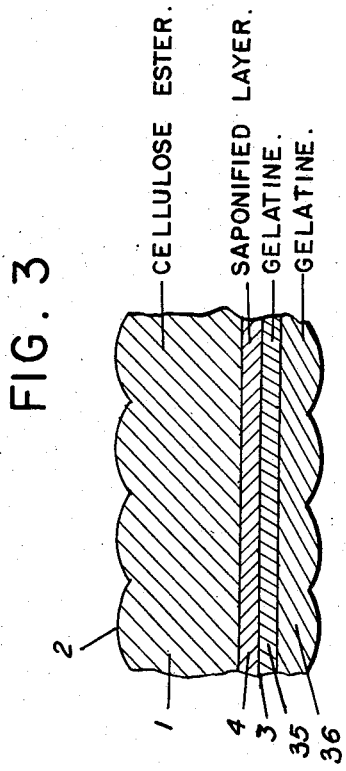
INVENTORS
**EDGAR GRETENER &
CARLO ROSSI**
BY Wenderoth, Lind & Ponack
ATTORNEYS April 1, 1958 E. GRETENER ET AL 2,829,051
PHOTOGRAPHICALLY SENSITIVE LENTICULAR FILM
Filed July 18, 1952 2 Sheets-Sheet 2

INVENTORS
**EDGAR GRETENER &
CARLO ROSSI**

BY Wenderoth, Lind & Ponack

ATTORNEYS

United States Patent Office 2,829,051
Patented Apr. 1, 1958

2,829,051

PHOTOGRAPHICALLY SENSITIVE LENTICULAR FILM

Edgar Gretener, Zurich, and Carlo Rossi, Basel, Switzerland, assignors to Ciba Limited, Basel, Switzerland Application July 18, 1952, Serial No. 299,642

Claims priority, application Switzerland July 19, 1951

4 Claims. (Cl. 96—75)

Films having lenticular gratings, as in the case of most photographic films, are generally produced from hydrolysable hydrophobic material, usually a cellulose ester such as cellulose nitrate and especially cellulose acetate. The lenticular grating is produced, for example, by embossing or by casting the film on a support provided with a suitable lenticular grating.

In lenticular films it is necessary for certain purposes especially for colour or stereoscopic projection, to record the image at an accurately predetermined place in the film, that is to say at such a distance from the lenses forming the grating that the conditions for optical projection are accurately fulfilled.

It is also desired in lenticular films that the records should be as far as possible grainless, for example, as provided by the process of Patent No. 2,689,792, granted September 21, 1954.

However, it is also desirable in some cases to apply a gelatine layer to the side of the film opposite to that on which the lenticular grating is formed by embossing. This is especially the case when the gelatine layer is to serve for the production by a photo-chemical method of a second lenticular grating optically corresponding to the first mentioned lenticular grating. However, a gelatine layer may also be desired in other cases, for example, for protective purposes.

The present invention is based on the observation that it is possible by the process of Patent 2,689,792, that is to say, with the use of a clear solution of acid reaction which contains, in addition to a complex iron salt, a silver salt, to sensitise such a lenticular film by effecting the sensitisation practically exclusively in a hydrolysed layer of the lenticular film consisting of hydrolysable hydrophobic material, without the superposed gelatine layer undergoing sensitisation to any important extent.

In the simplest case such a film may be constructed by treating in a first stage with a hydrolysing agent the smooth side of a film consisting of hydrolysable material, and, if desired, provided on one side with a lenticular grating. As hydrolysing agents there come into consideration more especially solutions of caustic alkalis, especially of sodium hydroxide or potassium hydroxide, with the use as solvents advantageously of a mixture of an alcohol and water, for example, of an aliphatic alcohol of low molecular weight such as methyl alcohol or ethyl alcohol and water. Depending on the purpose in view the water content may be relatively high or advantageously rather low, for example about 10–20 percent while the concentration of the caustic alkali may vary within wide limits, but advantageously within the range of about 4–12 percent, for example, about 8 percent. The hydrolysis may be carried out by a method in itself known, for example, with the temporary protection of the embossed surface or by the application of the hydrolysing solution to one side or by lowering the film upon the hydrolysing solution.

By washing away the hydrolysing solution after a period determined by preliminary experiments, for example, after a few minutes, and also by suitably choosing the temperature, the action of the hydrolysing solution can be regulated as desired, in other words, a uniform depth of the layer to be hydrolysed can be attained. For many purposes a temperature of about 20° C. can be used. The period required for attaining a predetermined depth of hydrolysis can be considerably shortened by raising the reaction temperature, for example to 40–50° C.

After washing away the hydrolysing solution the resulting film, if it has no lenticular grating, can be provided with such a grating by embossing on the non-hydrolysed side and one or more gelatine layers may be cast upon the film by a method in itself known. Thus, it may be of advantage in certain cases to apply a relatively thin layer of gelatine, which may if desired be slightly pre-hardened before casting, and to subject this layer before further treatment of the film to a further hardening; if desired, the sequence of operations can be so varied that one or more gelatine layers are first cast on to the hydrolysed side and only thereafter is the non-hydrolysed side embossed.

If desired, for example, for producing a grating on the gelatine layer, a further gelatine layer may be applied to a film pre-treated in the manner described above, whether or not it is first provided with the hardened layer, and which further gelatine layer enables a lenticular grating to be produced thereon by non-uniform hardening brought about by subjecting it to suitable illumination from the side carrying the first lenticular grating and by washing out the less hardened parts, as described in Patent 2,794,-739 (appln. Serial No. 145,661, filed February 23, 1950, by Edgar Gretener).

By following this procedure there is obtained a lenticular film having a grating on both sides but still not sensitised. If such a film, irrespective of whether it has a grating on both sides or only on one side, that is to say, whether the gelatine layer has or has not been given a grating, is sensitised with an acid sensitising solution as described above containing a complex iron compound, the unexpected result is obtained that the sensitisation under certain conditions, especially with the use of dyestuffs with high absorption power in the blue and ultra-violet part of the spectrum is limited to the saponified layer of the hydrophobic material, so that by subsequent development as described in Patent 2,689,792, picture formation is confined completely or to a great extent to the said layer.

Lenticular films constructed in accordance with the invention are illustrated in Figs. 1–3 of the accompanying drawings.

Fig. 1 shows a section through a film provided with a grating on one side,

Fig. 2 shows a section of a film provided with a grating on both sides, and

Fig. 3 shows a special form of film having a grating on both sides, which is provided with a special additional gelatine layer.

Figure 4:
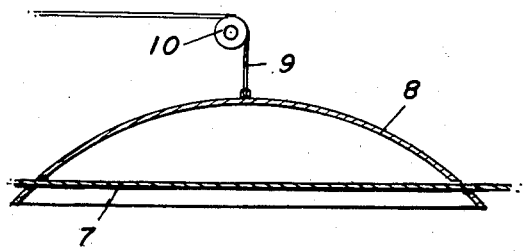

In these figures 1 denotes the film consisting of hydrolysable material provided with an embossed surface 2 and a smooth surface 3. 4 denotes the saponified layer of the film. In Fig. 1, 5 denotes a smooth gelatine layer whereas in Figure 2, 25 denotes a gelatine layer provided with a grating. In Fig. 3 a further gelatine layer 36 provided with a grating is superposed upon a smooth gelatine layer 35 acting as a stop layer.

Films constructed in the manner described above have numerous advantages. Firstly, recording of the image is obtained in an accurately predetermined layer of which the thickness can be kept small.

A desirable consequence of a layer of small thickness for recording the image is that lack of definition due to geometrical-optical phenomena is kept small, which is equivalent to a higher resolving power of the film material. Moreover, it is possible to avoid to a considerable extent deformation of the gelatine surface, which at least in certain cases has a harmful effect when the recording of the image occurs in the gelatine surface. Finally, it is also to be noted that in the case of a double sided grating the grating consists of gelatine of non-uniform hardness, whereby variations in sensitivity of the sensitized layer can occur, in cases where sensitisation occurs substantially in the gelatine layer.

Between the hydrolysed film layer and the upper gelatine layer, if desired provided with a grating, there may be arranged an intermediate layer which may be called a "stop layer," and which has the desirable effect of offering an increased resistance to the diffusion of salts, liquids, etc., for example, so that the penetration of chromate or bichromate ions into the hydrolysed film layer is prevented to a considerable extent, whereas the outer gelatine layer is completely penetrated thereby.

It is to be understood that the gelatine layers provided in accordance with the invention may be replaced wholly or in part by layers of other materials having similar photographic properties, for example, polyvinyl alcohol, certain proteins, etc. Accordingly, the term "gelatine" is used herein for simplicity to include such equivalent materials.

The following examples illustrate the manufacture of film material in accordance with the invention, the parts and percentages being by weight.

Example 1

(a) Partial hydrolysis of triacetate films:

A cellulose triacetate film provided on one side with cylindrical embossings and perforated at its edge is saponified on the smooth side to a depth of about 4μ by means of an ethyl alcoholic solution of caustic soda, by bringing it into contact while in a tightly stretched condition for 4 minutes at a temperature of 21–22° C. with a clear solution of the following composition:

Hydrolysing solution:
  16 grams of caustic soda,
  20 cc. of distilled water,
  180 cc. of ethyl alcohol of 96% strength.

The side of the film carrying the grating is prevented from coming into contact with the hydrolysing solution by carefully lowering the film onto the surface of the alcoholic solution by means of the arrangement shown in Fig. 4. In Fig. 4 the film 7 is held under tension by means of a flexible yoke 8 consisting, for example, of artificial resin and 9 denotes a thread running over a roll 10.

When the hydrolysis is finished the piece of film is rapidly immersed in distilled water which contains 0.05% of a non-ionogenic wetting agent (a condensation product of a fatty alcohol with ethylene oxide), and is washed for about 1 minute while keeping it in motion.

The film is subsequently left for a further 15 minutes in freshly distilled water and then dried at room temperature.

(b) Application of the gelatine layer to the hydrolysed film layer:

As starting material there is used an emulsion gelatine, of which a jelly of 10% strength has a melting range of 31–33° C.

0.05% of thymol is dissolved in 100 cc. of distilled water and 10 grams of granular gelatine are allowed to swell therein for 1 hour at room temperature. At the end of this period the solution is heated at 34° C. until the gelatine is completely dissolved, and then impurities and air bubbles are removed by filtration. In order to apply the gelatine uniformly to the hydrolysed surface of the film, there is used a polished and accurately levelled brass bar provided with an internal conduit through which cooling water or heating water can be passed to regulate the temperature as desired.

The casting bar has on its surface two grooves of about 1 millimetre in width, which extend along only a part of the length of the bar and enable the film to be held in position firmly by means of sub-atmospheric pressure.

The above described gelatine solution having a temperature of 34–35° C. is cast onto the hydrolysed surface of the film while the temperature of the water heating the casting bar is 34–36° C. and the excess of the gelatine solution is scraped off by means of a knife leaving a clear height of 0.5 millimetre.

By cooling the bar to 13–14° C. the gelatine is caused to solidify, and then the film is dried on the bar by means of dust-free air while the temperature of the heating water is 60° C.

The film is then tanned for 10 minutes in a hardening bath, which has been prepared by dissolving 10 grams of chrome alum of the formula $CrK(SO_4)_2.12H_2O$ and one gram of anhydrous sodium carbonate in 100 cc. of distilled water, and then in order to remove the excess of alum solution the film is washed for 10 minutes in distilled water to which 2% of glycerine and 0.1% of a non-ionogenic wetting agent has been added.

The film after being dried at room temperature is washed clean on the side carrying the mechanical grating by wiping it with a piece of moist buckskin, and then rendered sensitive to light on the other side by means of the tensioning device described under heading (a) above by means of a clear sensitising solution of the following composition:

13 grams of ferric ammonium citrate,
5 grams of silver nitrate,
4.6 grams of citric acid,
4.0 grams of the pyrazolone dyestuff of the following constitution:

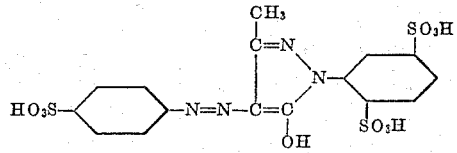

0.5 gram of a non-ionogenic wetting agent,
100 cc. of distilled water.

The above sensitising solution may be clarified, for example, by decantation after keeping it in a closed vessel for one week in the dark.

The film after being exposed by the copying methods usual in the case of lenticular films, is developed by means of an unstable silver solution by the process described in Patent No. 2,689,792. In the film described the separation of silver is unexpectedly confined to the hydrolysed intermediate layer, which constitutes a very important advantage both in connection with the resolving power of the layer and in the technique of variable areal recording.

Example 2

On the smooth side of a cellulose triacetate film hydrolysed on one side to a depth of about 3μ as described in Example 1, and provided on the other side with a cylindrical lenticular grating, is cast to a thickness of about 10μ a gelatine layer prehardened with potash alum. After drying there is applied to this layer a second layer of about 20μ thickness of unhardened gelatine.

The film is dried in dust-free air and then immersed at a temperature of 13–14° C. for 7–8 seconds in a bichromate solution of the following composition:

Bichromate solution:
  1,000 parts of water,
  30 parts of potassium bichromate,
  2 parts of a non-ionogenic wetting agent of the type of a condensation product of a fatty alcohol with ethylene oxide,
  0.2 part of ammonium carbonate.

After blowing off the excess of liquid by means of compressed air the film is dried at 33–34° C. in a powerful current of air.

In this manner it is possible to control the depth of penetration of the bichromate solution so that the hydrolysed layer of the film support remains practically unaffected thereby.

Figure 6:
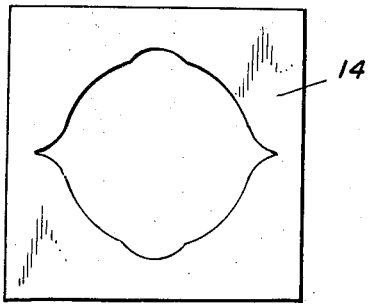
Figure 5:
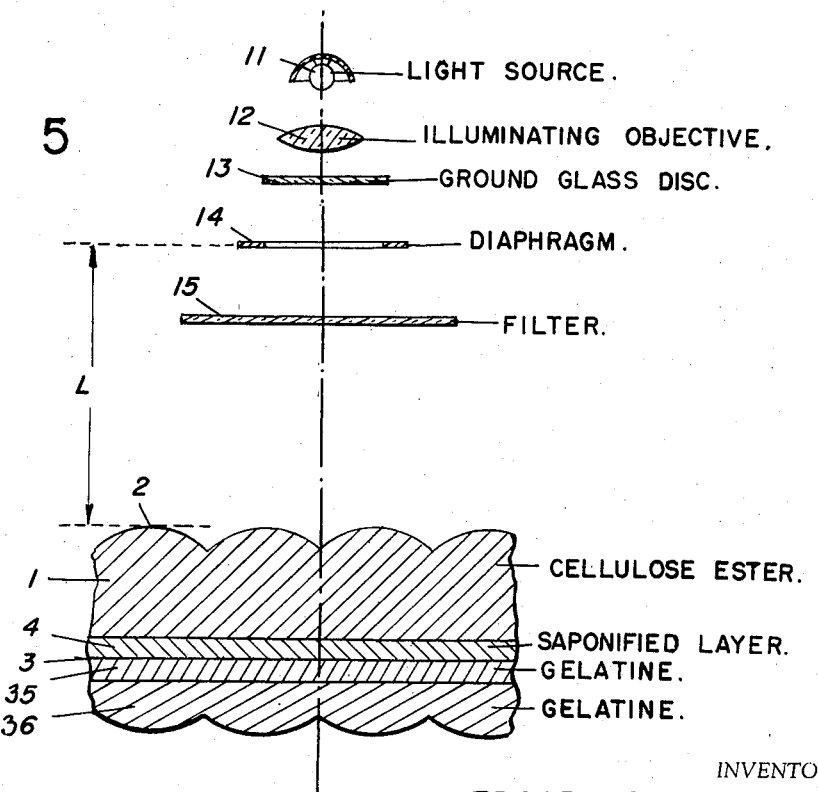

The film sensitised with bichromate in the manner described above is then exposed by means of the apparatus diagrammatically shown in section in Fig. 5, whereby each individual lenticulation of the mechanically produced grating forms an image of the exposure sub-division corresponding to the shape of the diaphragm in the corresponding zone of the gelatine layer. In Fig. 5, 11 denotes a source of light having a high content of ultra-violet rays, advantageously a mercury vapour lamp. 12 is an illuminating objective and 13 denotes a ground glass disc. The diaphragm 14, having the shape shown in Fig. 6, produces the desired distribution of light. A filter 15 is also inserted in the path of the rays, which filter absorbs the undesired heat and visible rays. The reference numerals 1–4, 35 and 36 denote the various parts of the film as described in connection with Fig. 3. The distance L must be so chosen that the lenticulations of the film form images of the diaphragm 14 in the appropriate manner in the gelatine layer. The film is shown on a greatly enlarged scale as compared with the projection apparatus.

The exposed film containing latent isosclerotic layers is then developed while being kept in motion for 10–20 minutes in water at 44–45° C., whereby an isosclerotic layer corresponding to the properties of solubility is formed as a profiled gelatine grating. The developed film is dried in dust-free air at 30–34° C.

In Fig. 5 the gelatine profile resulting from the above described treatment is shown in the interests of clarity, but of course during the exposure of the gelatine layer the surface is smooth and has no grating upon it.

In order to impregnate the double sided lenticular film the gelatine grating is brought into contact for 3 minutes by means of the tensioning device shown in Fig. 4 with the same sensitising solution. The sensitised film is then dried at a temperature of 34–35° C. in a dust-free current of air. The above described layer construction leads to a new type of double sided lenticular film which has the advantage that in the copies produced therewith the silver image is localised in the region of the hydrolysed intermediate layer.

What we claim is:

1. The process which comprises saponifying one side of a cellulose ester film base which carries cylindrical lenticulations on its other side, coating the saponified surface with a gelatine layer, tanning the gelatine layer, and impregnating the saponified side of the film with an acid aqueous sensitizing solution containing silver nitrate and ferric ammonium citrate.

2. The process according to claim 1, wherein the film is a cellulose triacetate film.

3. The process which comprises saponifying one side of a cellulose ester film base which carries cylindrical lenticulations on its other side; coating the saponified surface with a gelatine layer; sensitizing the gelatine layer; exposing through said lenticulations, developing to form a lenticular relief and tanning the sensitized gelatine layer; and impregnating the saponified side of the film with an acid aqueous sensitizing solution containing silver nitrate and ferric ammonium citrate.

4. The process which comprises saponifying one side of a cellulose ester film base which carries cylindrical lenticulations on its other side; coating the saponified surface with a gelatine layer; tanning the gelatine layer; coating the tanned gelatine layer with a second gelatine layer; exposing through said lenticulations, developing to form a lenticular relief and tanning the sensitized second gelatine layer; and impregnating the saponified side of the film with an acid sensitizing solution containing silver nitrate and ferric ammonium citrate.

References Cited in the file of this patent

UNITED STATES PATENTS

| | | |
|---|---|---|
| 1,683,315 | Stinchfield | Sept. 4, 1928 |
| 1,721,244 | Berthon | July 16, 1929 |
| 1,915,873 | Spencer | June 27, 1933 |
| 1,984,471 | Fischer | Dec. 18, 1934 |
| 2,271,228 | Nadeau et al. | Jan. 27, 1942 |
| 2,276,151 | Brandenberger | Mar. 10, 1942 |
| 2,494,053 | Mitson et al. | Jan. 10, 1950 |

FOREIGN PATENTS

| | | |
|---|---|---|
| 337,868 | Great Britain | Nov. 13, 1930 |